(12) United States Patent
Talwar et al.

(10) Patent No.: US 7,139,788 B2
(45) Date of Patent: Nov. 21, 2006

(54) MULTIPLICATION LOGIC CIRCUIT

(75) Inventors: Sunil Talwar, Leamington Spa (GB); Dmitriy Rumynin, Coventry (GB)

(73) Assignee: Arithmatica Limited (GB)

( * ) Notice: Subject to any disclaimer, the term of this patent is extended or adjusted under 35 U.S.C. 154(b) by 946 days.

(21) Appl. No.: 09/898,752

(22) Filed: Jul. 3, 2001

(65) Prior Publication Data

US 2002/0138538 A1 Sep. 26, 2002

(30) Foreign Application Priority Data

Mar. 22, 2001 (GB) ................................. 0107212

(51) Int. Cl.
G06F 7/50 (2006.01)

(52) U.S. Cl. .................... 708/626; 708/210
(58) Field of Classification Search ............ 708/626, 708/210
See application file for complete search history.

(56) References Cited

U.S. PATENT DOCUMENTS

| | | | | |
|---|---|---|---|---|
| 3,634,658 A | 1/1972 | Brown | ............... | 235/92 |
| 3,757,098 A | 9/1973 | Wright | ............... | 235/175 |
| 4,399,517 A | 8/1983 | Niehaus et al. | ............ | 364/784 |
| 4,607,176 A | 8/1986 | Burrows et al. | ............ | 307/449 |
| 5,095,457 A | 3/1992 | Jeong | ............... | 364/758 |
| 5,175,862 A | 12/1992 | Phelps et al. | ............ | 395/800 |
| 5,187,679 A | 2/1993 | Vassiliadis et al. | ......... | 364/786 |
| 5,325,320 A | 6/1994 | Chiu | ............... | 364/760 |
| 5,343,417 A | 8/1994 | Flora | ............... | 364/758 |
| 5,497,342 A | 3/1996 | Mou et al. | ............ | 364/786 |
| 5,524,082 A | 6/1996 | Horstmann et al. | ......... | 364/489 |
| 5,701,504 A | 12/1997 | Timko | | |
| 5,978,827 A * | 11/1999 | Ichikawa | ............ | 708/709 |
| 5,995,029 A | 11/1999 | Ryu | ............... | 341/101 |
| 6,023,566 A | 2/2000 | Belkhale et al. | ........ | 395/500.03 |
| 6,490,608 B1 | 12/2002 | Zhu | ............... | 708/626 |
| 6,938,061 B1 | 8/2005 | Rumynin et al. | | |
| 2002/0026465 A1 | 2/2002 | Rumynin et al. | ............ | 708/210 |
| 2002/0078110 A1 | 6/2002 | Rumynin et al. | ............ | 708/210 |
| 2004/0103135 A1 | 5/2004 | Talwar | | |
| 2004/0153490 A1 | 8/2004 | Talwar et al. | | |

FOREIGN PATENT DOCUMENTS

| | | |
|---|---|---|
| EP | 0168650 | 1/1986 |
| EP | 0309292 | 3/1989 |
| EP | 0442356 | 8/1991 |
| EP | 0741354 | 11/1996 |
| FR | 2475250 | 8/1981 |
| GB | 2016181 | 9/1979 |
| GB | 2062310 | 5/1981 |
| GB | 2365636 | 2/2002 |
| GB | 2365637 | 2/2002 |
| WO | WO-99/22292 | 5/1999 |
| WO | WO-02/12995 | 2/2002 |

OTHER PUBLICATIONS

Chakraborty, S., et al., "Synthesis of Symmetric Functions for Path–Delay Fault Testability", *12th International Conference on VLSI Design*, (1999),pp. 512–517.

(Continued)

Primary Examiner—David H. Malzahn
(74) Attorney, Agent, or Firm—Schwegman, Lundberg, Woessner & Kluth P.A.

(57) ABSTRACT

A multiplication logic circuit comprises array generation logic and array reduction logic. The array reduction logic comprises array reduction logic for a first level of array reduction which comprises maximal length parallel counters for reducing maximal length columns. The output of the maximal length parallel counters are then further reduced by a second level of reduction logic comprising logic circuits with asymmetric delays in order to compensate for the differential delays experienced by the outputs of the maximal length parallel counters.

5 Claims, 8 Drawing Sheets

OTHER PUBLICATIONS

Debnath, D., "Minimization of AND–OR–EXOR Three–Level Networks with AND Gate Sharing", *IEICE Trans. Inf. & Syst., E80–D, 10*, (1997),pp. 1001–1008.

Drechsler, R., et al., "Sympathy: Fast Exact Minimization of Fixed Polarity Reed–Muller Expressions for Symmetric Functions", *IEEE*, (1995),pp. 91–97.

Goto, et al., "A 54×54–b Regularly Structured Tree Multiplier", *IEEE Journal of Solid–State Circuits*, vol. 27, No. 9, (Sep. 1992),1229–1236.

Hekstra, et al., "A Fast Parallel Multiplier Architecture", *IEEE International Symposium on Circuits and Systems; Institute of Electrical and Electronic Engineers*, c1977–c1996, 20v. :ill. :28cm, (1992),2128–2131.

Nienhaus, H., "Efficient Multiplexer Realizations of Symmetric Functions", *IEEE*, (1981),pp. 522–525.

Oklobdzija, V G., et al., "Improving multiplier design by using improved column compression tree and optimized final adder in CMOS technology", *IEEE transactions on Very Large Scale Integration (VLSI) Systems*, IEEE, Inc, New York, vol. 3, No. 2,(1995),292–301.

Vassiliadis, S., et al., "7/2 Counters and Multiplication with Threshold Logic", *IEEE*, (1997),pp. 192–196.

Zuras, D, et al., "Balanced delay trees and combinatorial division in VLSI", *IEEE Journal of Solid State Circuits, SC–21*, IEEE Inc, New York, vol. SC–21, No. 5,(1986), 814–819.

PCT International Search Report for corresponding application No. PCT/GB02/01343, international filing date Mar. 21, 2002, mailing date Dec. 27, 2002, four pages.

Booth, A.D., "A Signed Binary Multiplication Technique", *Oxford University Press*, Reprinted from Q.J. Mech. Appl. Math. 4:236–240, pp. 100–104, (1951).

Dadda, L., "On Parallel Digital Multipliers", *Associazione Elettrontecnia ed Elettronica Italiana*, Reprinted from Alta Freq. 45:574–580, pp. 126–132, (1976).

Dadda, L., "Some Schemes For Parallel Multipliers", *Assocciazione Elettrotenica ed Elettronica Italiana*, Reprinted from Alta Freq. 34:349–356, pp. 118–125, (1965).

Fleisher, H., "Combinatorial Techniques for Performing Arithmetic and Logical Operations", *IBM Research Center*, RC–289, Research Report, pp. 1–20, (Jul. 18, 1960).

Foster, C.C., et al., "Counting Responders in an Associative Memory", *The Institute of Electrical and Electronics Engineers, Inc.*, Reprinted, with permission, from IEEE Trans. Comput. C–20:1580–1583, pp. 86–89, (1971).

Ho, I.T., et al., "Multiple Addition by Residue Threshold Functions and Their Representation By Array Logic", *The Institute of Electrical and Electronics Engineers, Inc.*, Trans. Comput. C–22: 762–767, pp. 80–85, (1973).

Jones, R.F., et al., "Parallel Counter Implementation", *Conf. Rec. 26th Asilomar Conf. Signals, Systems & Computers*, vol. 1, ISBN 0–8186–3160–0, pp. 381–385, (1992).

Swartzlander, Jr., E.E., "Parallel Counters", *Institute of Electrical and Electronic Engineers, Inc., Reprinted, with permission from IEEE Trans. Comput.*, C–22:1021–1024, pp. 90–93, (1973).

Wallace, C.S., "A Suggestion for a Fast Multiplier", *The Institute of Electrical and Electronics Engineers, Inc.*, Reprinted, with permission, from IEEE Trans. Electron. Comput. EC–13:14–17, pp. 114–117, (1964).

"Communication Pursuant to Article 96(2) EPC, for Application No. EP 02 722 402.1, date mailed Jun. 6, 2005", 3 Pages.

Nicholson, J.O., "Parallel–Carry Adders Listing Two–Bit Covers", *IBM Technical Disclosure, Bulletin, 22(11),*(Apr. 1980), 5036–5037.

Ong, S., et al., "A Comparison of ALU Structures for VLSI Technology", *Proceedings, 6th Symposium on Computer Arithmetic (IEEE),*(1983), 10–16.

Schmookler, M. S., et al., "Group–Carry Generator", *IBM Technical Disclosure Bulletin*, 6(1), (Jun. 1963), 77–78.

Song, Paul J., et al., "Circuit and Architecture Trade–offs for High–Speed Multiplication", *IEEE Journal of Solid–State Circuits*, vol. 26, No. 9,(Sep. 1991), 1184–1198.

Weinberger, A., "Extension of the Size of Group Carry Signals", *IBM Technical Disclosure Bulletin, 22(4),*(Sep. 1979), 1548–1550.

Weinberger, A., "Improved Carry–Look–Ahead", *IBM Technical Disclosure Bulletin,* 21(6), (Nov. 1978), 2460–2461.

\* cited by examiner

MULTIPLICATION LOGIC CIRCUIT

CLAIM OF PRIORITY

This application claims priority under 35 U.S.C. 119 of United Kingdom Application No. 0107212.3, filed Mar. 22, 2001.

FIELD OF THE INVENTION

The present invention generally relates to digital electronic devices and more particularly to a multiplication logic circuit for multiplying two binary numbers.

BACKGROUND OF THE INVENTION

It is instrumental for many applications to have a block that adds n inputs together. An output of this block is a binary representation of the number of high inputs. Such blocks, called parallel counters (L. Dadda, *Some Schemes for Parallel Multipliers*, Alta Freq 34: 349–356 (1965); E. E. Swartzlander Jr., *Parallel Counters*, IEEE Trans. Comput. C-22: 1021–1024 (1973)), are used in circuits performing binary multiplication. There are other applications of a parallel counter, for instance, majority-voting decoders or RSA encoders and decoders. It is important to have an implementation of a parallel counter that achieves a maximal speed. It is known to use parallel counters in multiplication (L. Dadda, *On Parallel Digital Multipliers*, Alta Freq 45: 574–580 (1976)).

A full adder is a special parallel counter with a three-bit input and a two-bit output. A current implementation of higher parallel counters i.e. with a bigger number of inputs is based on using full adders (C. C. Foster and F. D. Stockton, *Counting Responders in an Associative Memory*, IEEE Trans. Comput. C-20: 1580–1583 (1971)). In general, the least significant bit of an output is the fastest bit to produce in such implementation while other bits are usually slower.

The following notation is used for logical operations:

⊕-Exclusive OR;
v-OR;
^-AND;
¬-NOT.

Figure 1:
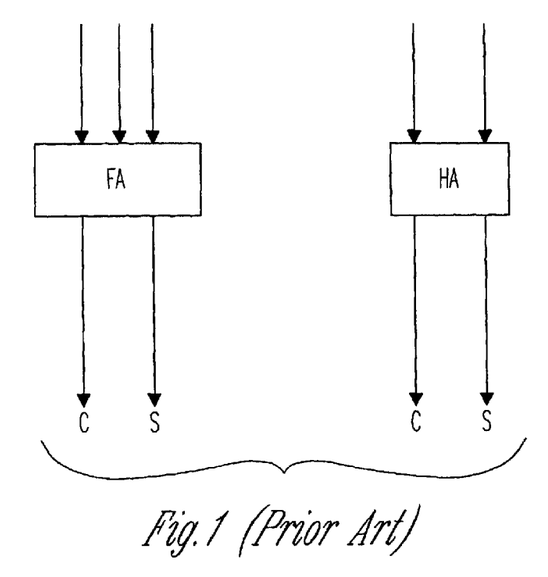
FIG. 1 is a schematic diagram of a full adder and a half adder in accordance with the prior art.

An efficient prior art design (Foster and Stockton) of a parallel counter uses full adders. A full adder, denoted FA, is a three-bit input parallel counter shown in FIG. 1. It has three inputs $X_1$, $X_2$, $X_3$, and two outputs S and C. Logical expressions for outputs are $$S = X_1 \oplus X_2 \oplus X_3,$$

$$C = (X_1 \char`\^ X_2) v (X_1 \char`\^ X_3) v (X_2 \char`\^ X_3).$$

A half adder, denoted HA, is a two bit input parallel counter shown in FIG. 1. It has two inputs $X_1$, $X_2$ and two outputs S and C. Logical expressions for outputs are $$S = X_1 \oplus X_2,$$

$$C = X_1 \char`\^ X_2.$$

Figure 2:
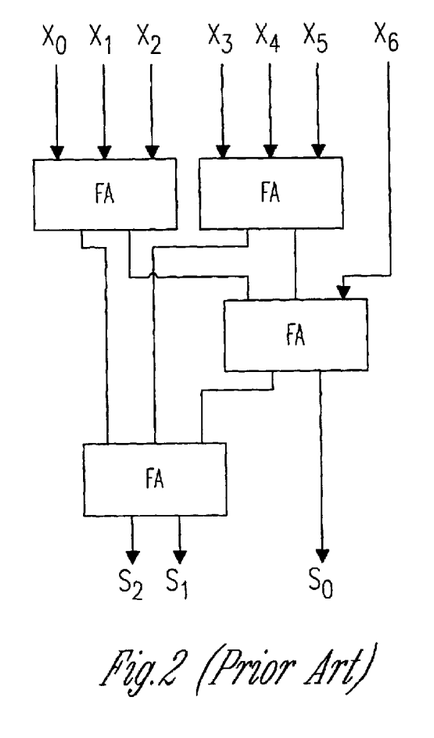
FIG. 2 is a schematic diagram of a parallel counter using full adders in accordance with the prior art.

A prior art implementation of a seven-bit input parallel counter illustrated in FIG. 2.

Multiplication is a fundamental operation. Given two n-digit binary numbers $$A_{n-1}2^{n-1} + A_{n-2}2^{n-2} + \ldots + A_1 2 + A_0 \text{ and } B_{n-1}2^{n-1} + B_{n-2}2^{n-2} + \ldots + B_1 2 + B_0,$$

their product $$P_{2n-1}2^{2n-1} + P_{2n-2}2^{2n-2} + \ldots P_1 2 + P_0$$

may have up to 2n digits. Wallace has invented the first fast architecture for a multiplier, now called the Wallace-tree multiplier (Wallace, C. S., *A Suggestion for a Fast Multiplier*, IEEE Trans. Electron. Comput. EC-13: 14–17 (1964)). Dadda has investigated bit behaviour in a multiplier (L. Dadda, *Some Schemes for Parallel Multipliers*, Alta Freq 34: 349–356 (1965)). He has constructed a variety of multipliers and most multipliers follow Dadda's scheme.

Figure 3:
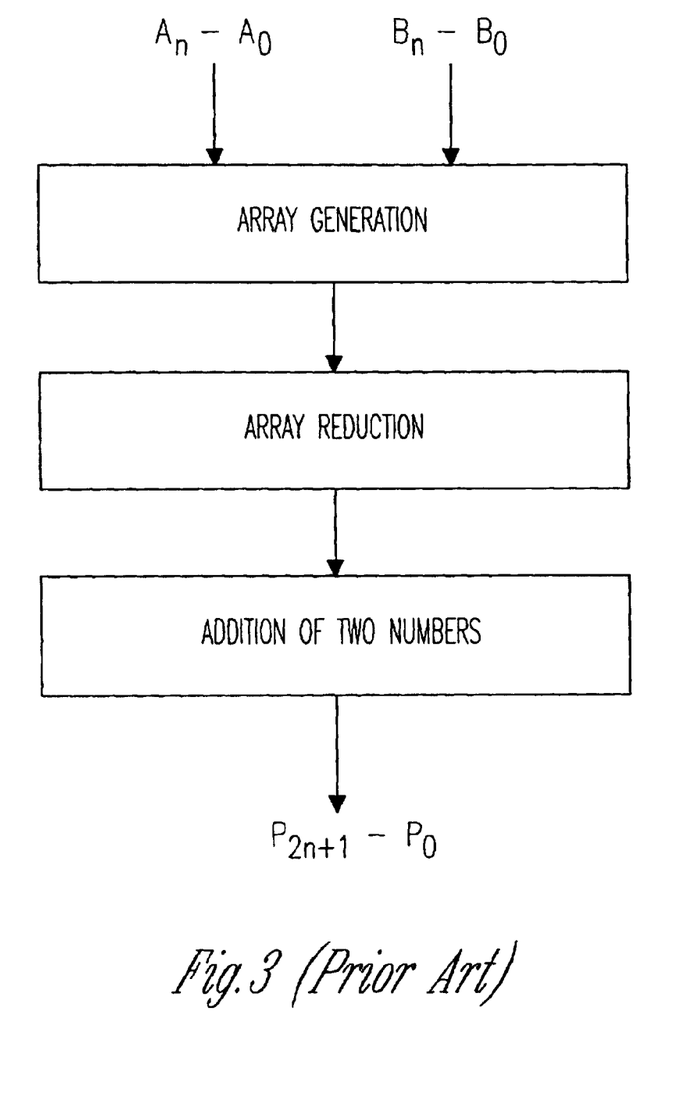
FIG. 3 is a diagram of the steps used in the prior art for multiplication.
Figure 4:
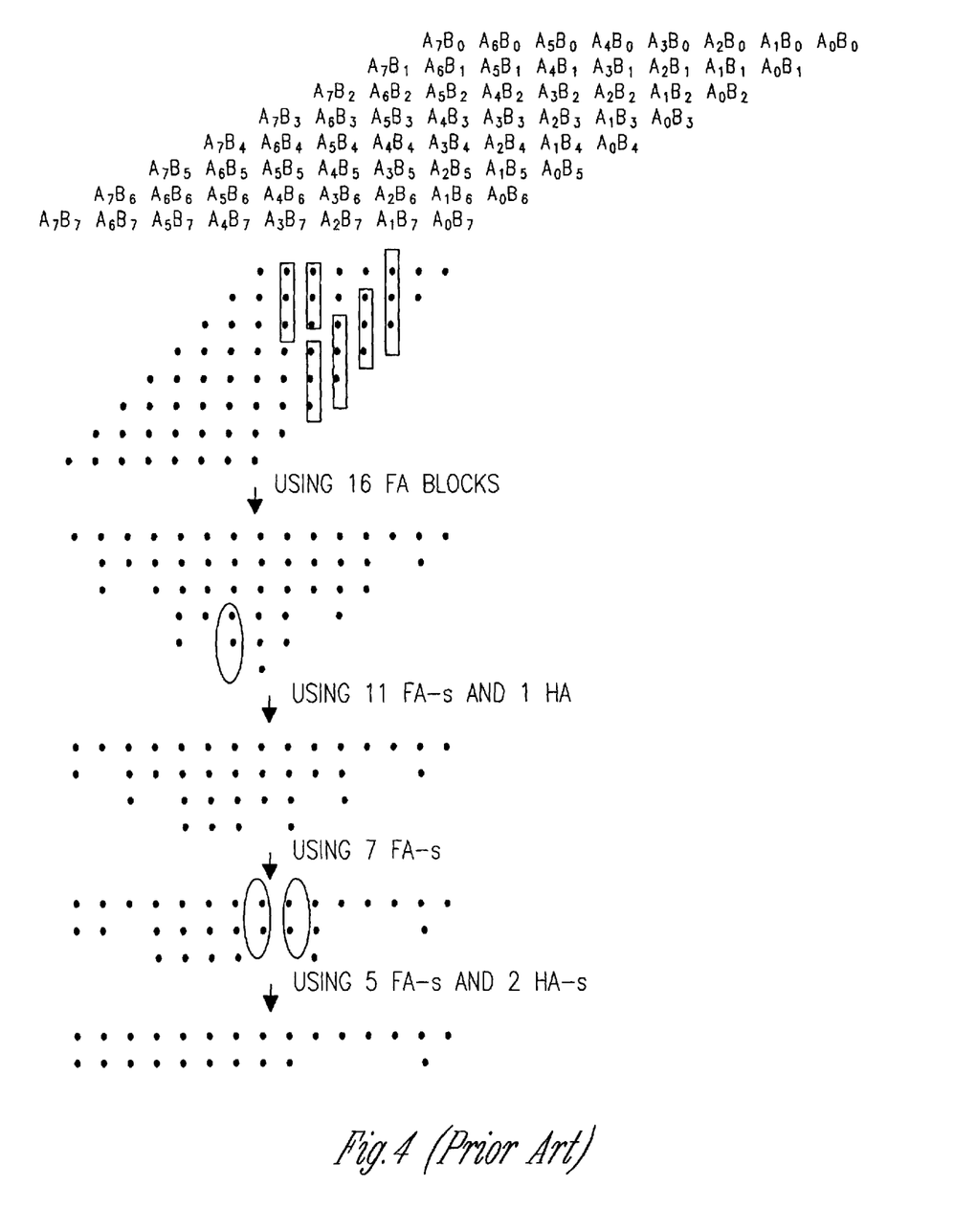
FIG. 4 is a schematic diagram of the process of FIG. 3 in more detail.

Dadda's multiplier uses the scheme in on FIG. 3. If inputs have 8 bits then 64 parallel AND gates generate an array shown in FIG. 4. The AND gate sign ^ is omitted for clarity so that $A_j \char`\^ B_j$ becomes $A_i B_j$. The rest of FIG. 4 illustrates array reduction that involves full adders (FA) and half adders (HA). Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of the fast addition schemes, for instance, conditional adder or carry-look-ahead adder.

UK patent application Numbers 0019287.2 and 0101961.1 and U.S. patent application Ser. No. 09/637,532 and US patent application entitled "A parallel counter and a multiplication logic circuit" filed on Jan. 25, 2001, the contents of all of which are hereby incorporated by reference, disclose a technique for the modification or deformation of the array prior to array reduction. The array deformation derives the benefit of reducing the depth of the array to a number greater than $2^{n-1}-1$ and less than or equal to $2^n-1$, where n is an integer. This reduction of the maximum depth of the array enables the efficient use of parallel counters in the array reduction step.

SUMMARY OF THE INVENTION

It is an object of the present invention to provide improved multiplication logic circuit in which the speed of operation of the multiplication logic circuit is improved.

The present inventors have realised that in the array reduction step the use of maximal length parallel counters can significantly reduce wiring delays present in the prior art array reduction logic. The inventors have also however realised that the outputs of the maximum length parallel counters experience different gate delays. Thus in accordance with the present invention, in addition to the use of maximal length parallel counters in the array reduction step, the outputs of the maximal length parallel counters are input to reduction logic circuits with asymmetric delays to ameliorate the effects of the differential delays of the output of the parallel counter circuits.

Thus in accordance with the present invention, outputs generated from the maximal length parallel counter logic that experience shorter delays are input to reduction logic inputs which incur longer delays in the generation of the output. Outputs of the maximal length parallel counter logic that experiences longer delays within the parallel counter logic are input to inputs of the asymmetric reduction logic which experience shorter delays in the generation of the output. Thus in this way the overall delays through the parallel counter logic and the further reduction logic are balanced and the differences in delays through the parallel counter logic is compensated for by the further reduction logic.

In accordance with the present invention, at least one maximal parallel counter is used in the array reduction step to reduce the array in one dimension by receiving all of the values in the array in one column In a preferred embodiment of the present invention the array is modified by undergoing the array deformation as disclosed in co-pending UK applications numbers 0019287.2 and 0101961.1, U.S. application Ser. No. 09/637,532, and U.S. application Ser. No. 09/769,954, the content of which are hereby incorporated by reference. Array deformation provides the benefit of reducing the number of inputs for a maximal column to a number greater than $2^{n-1}-1$ and less than or equal to $2^n-1$, where n is an interger. For example, for the multiplication of two 16 bit numbers, the array deformation process reduces the maximal depth of the array to 15 bits in any given column thereby enabling 15 bit input, 4 bit output parallel counters to be used in the first reduction step to reduce the array depth to a maximum of 4 bits. For a 32 bit input, the array deformation step reduces the maximal height of the array to 31 bits in any given column thereby enabling a 31 bit input, 5 output parallel counter to be used to provide an array of reduced depth which is a maximum of 5 bits.

In an embodiment of the present invention, the reduction logic with asymmetric delays comprises any combination of full adders, half adders and 4 to 2 compressors. Where a number of outputs from the parallel counters is 4 or more, 4 to 2 compressors are preferably used to generate to 2 bit outputs.

BRIEF DESCRIPTION OF THE DRAWINGS

Embodiments of the present invention will now be described with reference to the accompanying drawings, in which.

DETAILED DESCRIPTION

Figure 5:
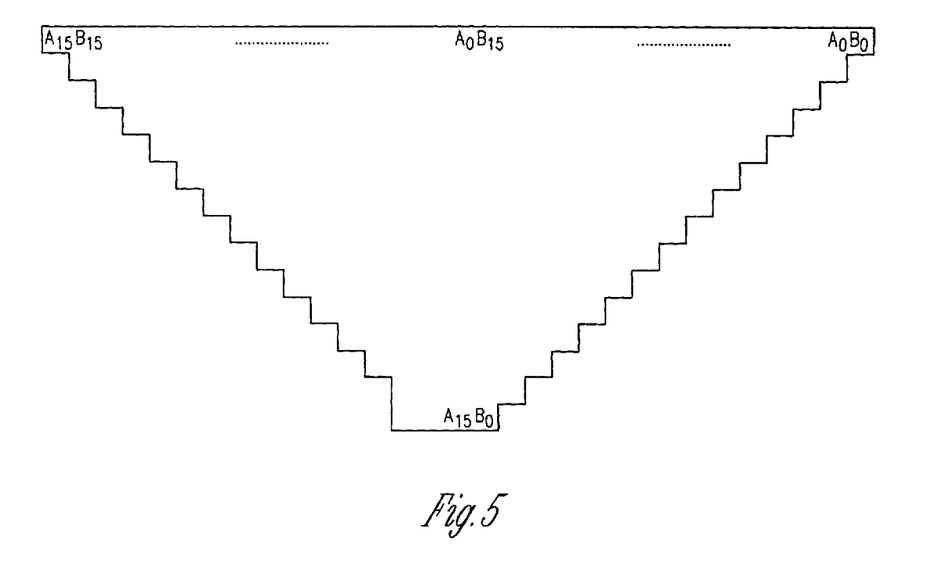
FIG. 5 is a schematic diagram illustrating the structure of a generated deformed array in accordance with an embodiment of the present invention.

In the embodiment illustrated in FIG. 5, the array generated in the process for multiplying two 16 bit binary numbers A and B is formed as a deformed array in accordance with the process disclosed in copending UK patent applications numbers 0019287.2 and 0101961.1, U.S. patent application Ser. No. 09/637,532 and a U.S. patent application Ser. No. 09/769,954, the contents of which is hereby incorporated by reference. The advantage of this array over the array of the prior art as illustrated in FIG. 4 is that the maximum number of bits in a column is smaller. In the prior art, for a 16 bit multiplication, a column will have 16 bits. The array of FIG. 5 has four columns with 15 bits.

Figure 6:
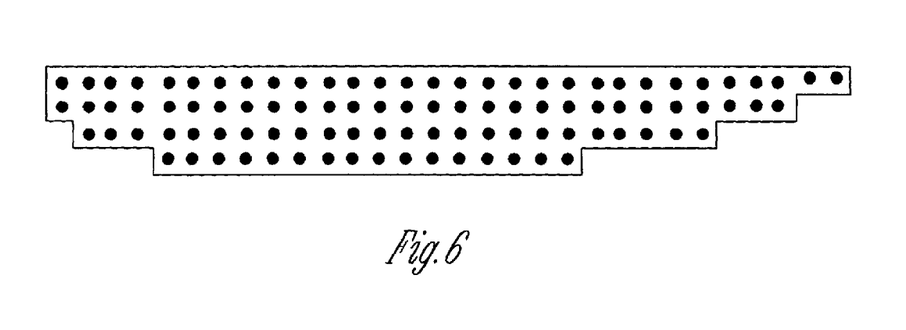
FIG. 6 is a schematic diagram illustrating the array after reduction by maximal length parallel counters in accordance with an embodiment of the present invention.

The first reduction step to reduce the array comprises the use of parallel counters to reduce each column from a maximum of 15 bits to 4 bits maximum as illustrated in FIG. 6. Any conventional parallel counters can be used for reducing the maximal columns of 15 bits to 4 bits, although it is preferable to use the parallel counters disclosed in the co-pending applications identified above.

The 4 bits output from the parallel counters will have experienced different gate delays. Typically 2 outputs experience 4 gate delays and 2 outputs experience 5 gate delays. However, the use of a single logic circuit in the form of a maximal length parallel counter for the reduction of the array greatly reduces the wiring between circuits. There is thus a significant wiring benefit in using maximal length parallel counters.

Figure 7:
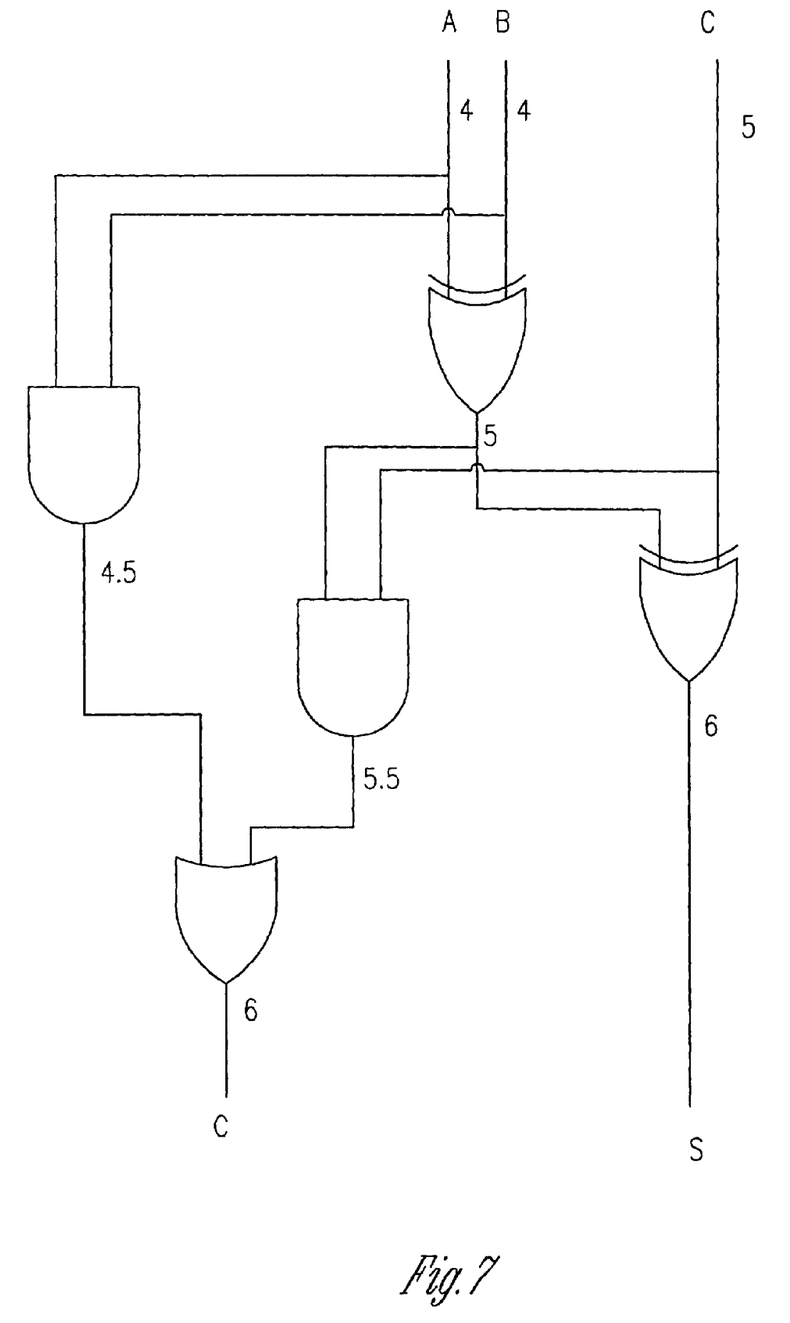
FIG. 7 is a diagram of the logic of a full adder showing the gate delays.

FIG. 7 is a logic diagram of a full adder that illustrates the asymmetric nature of the circuit. Inputs A and B can comprise outputs from a maximal length parallel counter which have experience 4 gate delays and are therefore relatively advanced compared to the input to the circuit C which is an output from the maximal length parallel counter which has experienced 5 gate delays. Each gate delay in this example is expressed as an EXOR gate delay which is the slowest gate. And and OR gates are considered to have a relative delay of 0.5. FIG. 7 illustrates the cumulate gate delay and as can be seen, the sum S is output with a cumulative gate delay of 6 and a carry C is also output with a cumulative gate delay of 6. Thus the full adder can be used as part of the second level of array reduction in order to compensate for the relative gate delays of the outputs of the maximal length parallel counters in the first level of array reduction.

Figure 8:
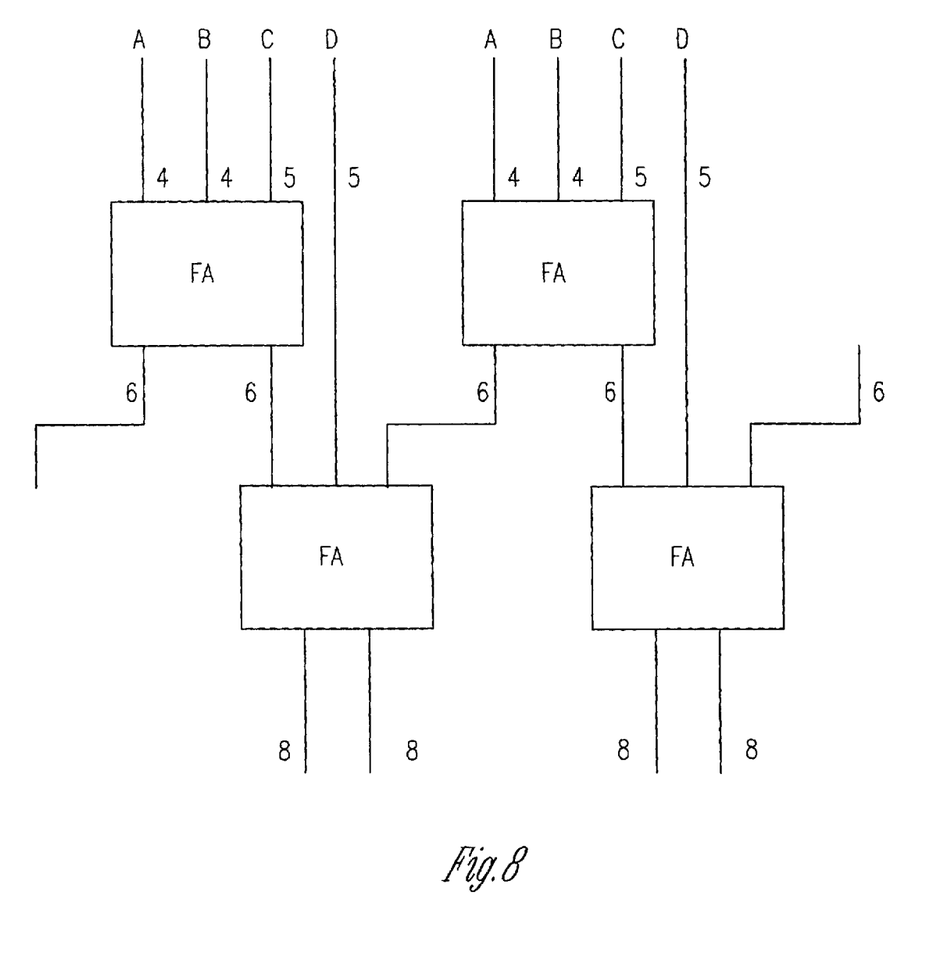
FIG. 8 is a schematic diagram of a 4 to 2 compressor constructed from full adders in accordance with an embodiment of the present invention.

FIG. 8 is a schematic logic diagram of two adjacent 4 to 2 compressors each comprised of 2 full adders. The relative gate delays are illustrated to illustrate the asymmetric nature of the logic used as a second level of logic reduction in this embodiment of the present invention.

Figure 9:
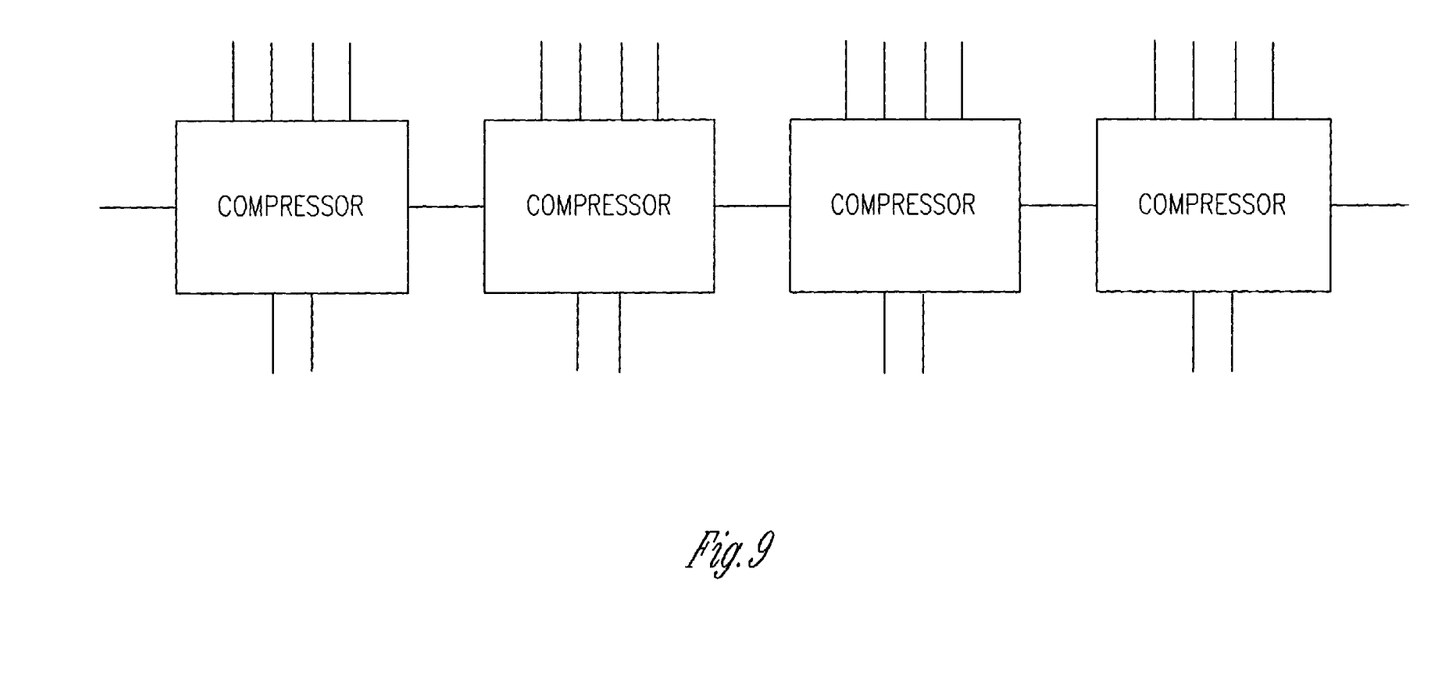
FIG. 9 is a schematic diagram of the logic circuit for the second stage of the array reduction using 4 to 2 compressors in accordance with an embodiment of the present invention.

FIG. 9 illustrates a chain of 4 to 2 compressors used to receive each of 4 columns of bits from the reduced array following the first level of reduction by the maximal length parallel counters. The output of the 4 to 2 compressors for each column comprises 2 bits. The 2 bits can then be added using conventional addition logic circuitry to generate the output binary number comprising a multiplication of the 2 n bit binary numbers.

Figure 10:
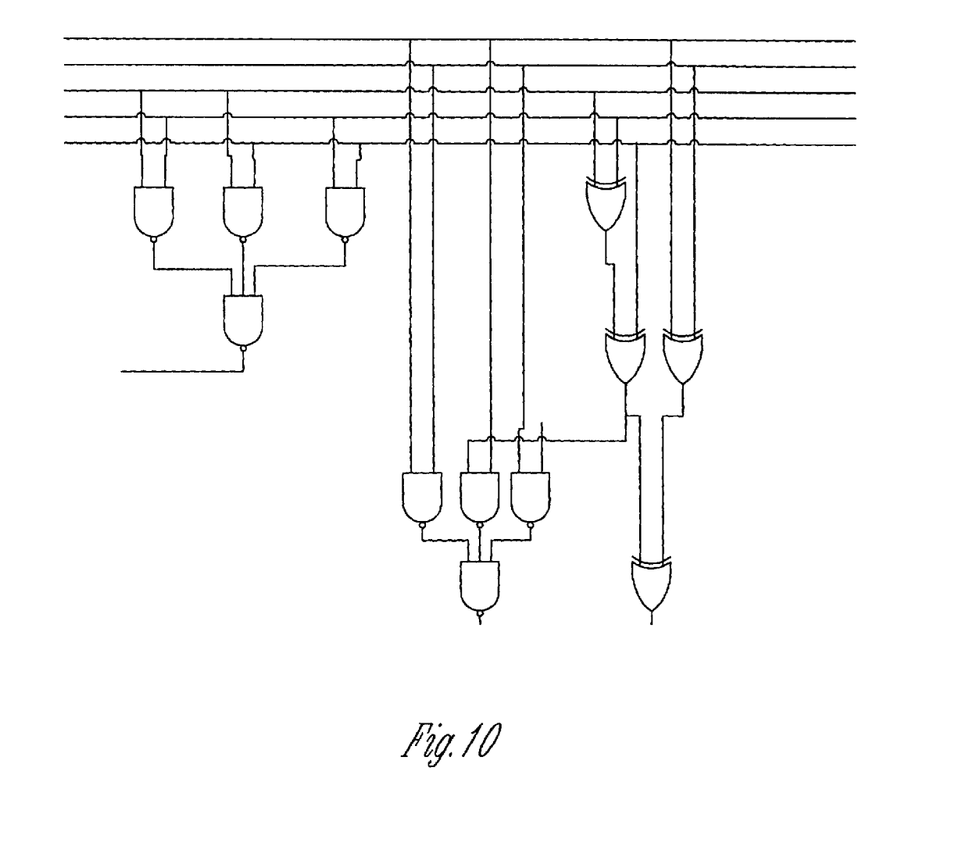
FIG. 10 is a diagram of the logic of a 4 to 2 compressor.

FIG. 10 is a logic diagram of the 4 to 2 compressor in accordance with an embodiment of the present invention.

Thus in this embodiment of the present invention an array is generated and modified by array deformation in accordance with the applicant's earlier inventive array modification technique. The array is reduced in two stages. The first stage is built upon the recognition that the wiring of the multiplication logic circuit can be reduced if a single parallel counter is used for the reduction of each column of the array. This however results in outputs which have suffered differential gate delays. Thus the invention ameliorates this problem by using a second level of array reduction which uses logic circuits for which the inputs experience relative differential gate delays i.e., the logic circuit imposes asymmetric delays on the inputs. In this way the relative delays caused by the use of the maximal length parallel counters does not cause a delay in the further reduction step.

Thus this multiplication logic circuit is highly efficient since it has reduced wiring and increase speed because of the balancing of the gate delays in the logic circuit.

Although the present invention has been described hereinabove with reference to a specific embodiment, it will be apparent to a skilled person in the art that modifications lie within the spirit and scope of the present invention.

For example, although the present invention has been described hereinabove with reference to a specific example in which the array is deformed before array reduction, the present invention is applicable to the reduction of an undeformed array. For example, the array can be generated using any prior art technique and can include the use of Booth encoding for the array generation step.

In the present invention any prior art parallel counter logic circuit can be used for the first level of the array reduction. Parallel counters can be used for any number of the columns that need not be used for all columns. For example, for the columns with three bits, a full adder can be used. It may also be desirable for some columns to use full adders rather than the parallel counter. The number of columns reduced by the use of parallel counters is a design choice. It is however envisaged that it is preferable to use parallel counters for any columns having more than 3 bits in the array.

In accordance with the present invention, the second array reduction step can be implemented by any suitable logic for which there are differential delays experienced by the inputs in the generation of the outputs.

Although in the present invention any form of parallel counter can be used, in a preferred embodiment, the parallel counters disclosed in UK patent applications numbers 0019287.2 and 0101961.1, U.S. patent application Ser. No. 09/637,532 and a U.S. patent application Ser. No. 09/769,954 are used.

In the present invention any conventional method can be used for the final step of addition of the two binary numbers in order to generate the output of the multiplication logic circuit.

What is claimed is:

1. A multiplication logic circuit for multiplying two n bit binary numbers, the circuit comprising:

array generation logic for performing the logical AND operation between each bit in one binary number and each bit in the other binary number to generate an array of logical AND combinations comprising an array of binary values;

array reduction logic for reducing the depth of the array to two binary numbers; and addition logic for adding the binary values of the binary numbers;

wherein the array reduction logic comprises:

first array reduction logic comprising a plurality of binary counters, each for receiving the binary values of all binary numbers in a respective column of the array, and for outputting binary numbers; and second array reduction logic having logic imposing asymmetric delays on inputs to the logic and for receiving the binary numbers output from the parallel counters at the inputs and for outputting said binary numbers to said addition logic.

2. A multiplication logic circuit according to claim 1, wherein said first array reduction logic includes adder logic for adding binary values of binary numbers in respective columns.

3. A multiplication logic circuit according to claim 2, wherein said adder logic comprises at least one full adder.

4. A multiplication logic circuit according to claim 2, wherein said adder logic is arranged to add binary values of binary numbers for columns in said array having 3 or less bits.

5. A multiplication logic circuit according to claim 1, wherein said second array reduction logic comprises any one of or combination of a full adder, a half adder, and four to two compressor logic.

* * * * *